May 4, 1954 F. R. GETSINGER 2,677,399
GUIDE MECHANISM FOR POWER-DRIVEN HAND HELD CIRCULAR SAWS
Filed Dec. 5, 1952 2 Sheets-Sheet 1
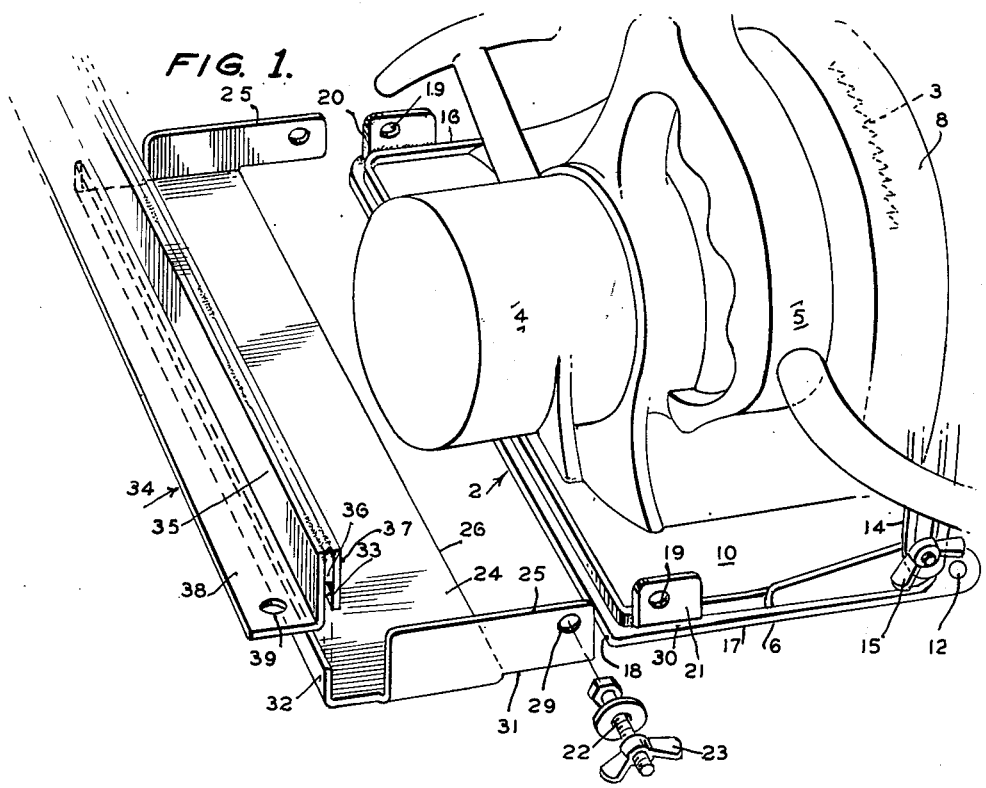
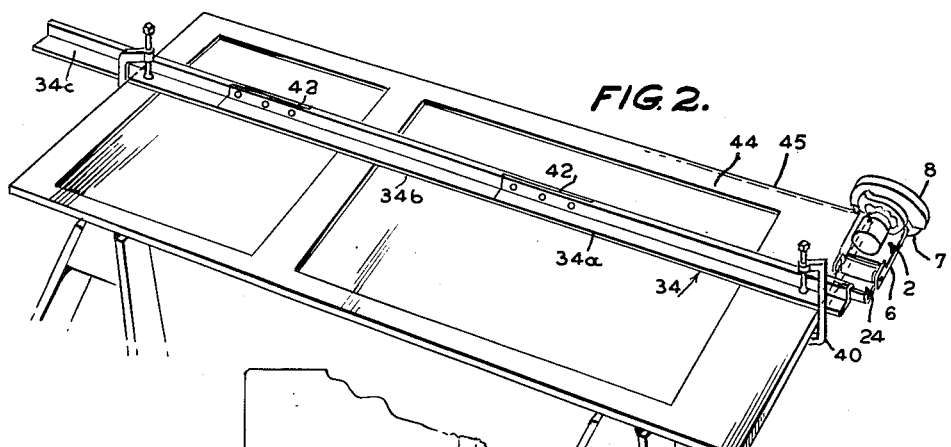
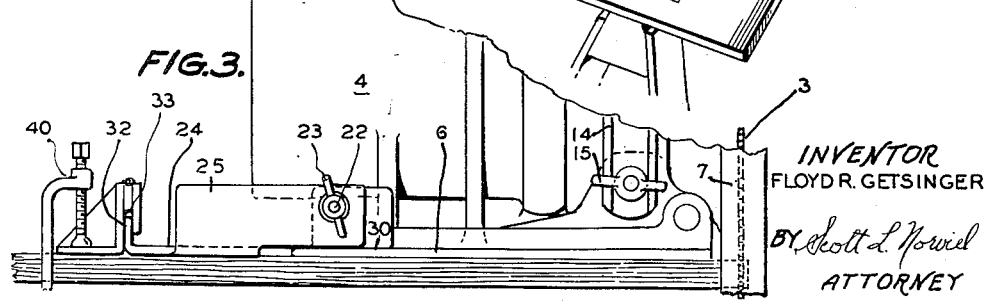
INVENTOR
FLOYD R. GETSINGER
BY *Scott L. Norvell*
ATTORNEY May 4, 1954     F. R. GETSINGER     2,677,399
GUIDE MECHANISM FOR POWER-DRIVEN HAND HELD CIRCULAR SAWS
Filed Dec. 5, 1952     2 Sheets-Sheet 2
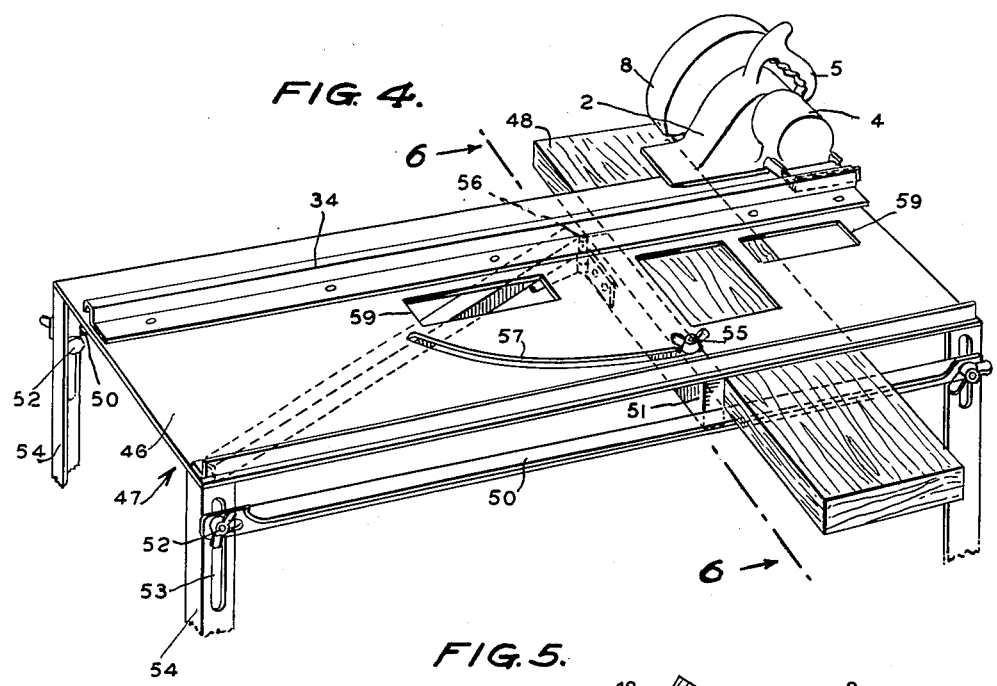
INVENTOR
FLOYD R. GETSINGER
BY Scott L. Norvel
ATTORNEY Patented May 4, 1954

2,677,399

UNITED STATES PATENT OFFICE 2,677,399

GUIDE MECHANISM FOR POWER-DRIVEN
HAND HELD CIRCULAR SAWS

Floyd R. Getsinger, Phoenix, Ariz.

Application December 5, 1952, Serial No. 324,352

3 Claims. (Cl. 143—6)

This invention concerns guide mechanism for power driven hand held circular saws.

With the advent of power driven hand held circular saws it became quickly evident to those familiar with their use that it was desirable to provide means for guiding the saw thru the work by mechanical means. In keeping with this idea it was also thought desirable to guide the saw at various angles with reference to the work for many purposes. Many devices have been suggested but each has had the common fault that there was no adequate provision for attaching the saw frame shoe to the guide, and for maintaining it in a safe condition relative to the work. Furthermore, there have been no adaptations of such devices which may be used with the saw cutting-segment directed downward, so as to maintain the inherent safety features of the saw frame and blade guards.

In view of the foregoing, one of the objects of my invention is to provide a guide for the shoes of power driven hand saws which will enable the saw to be moved freely in a predetermined direction, and which will hold the saw from dislodgment during the sawing operation, and which will enable the user to remove it from the guide rail easily and quickly, when desired.

Another object concerns the provision of a circular hand saw, driven by an electric motor, which has a detachable guide plate adapted to run on a slide which may be clamped on an object to be sawed, such as a door, so that the user may run the saw along the guide and take a cut of predetermined thickness and uniform width which is determined by the position of said guide;

Another object is to provide a table with a guide, or guide rail, extending along one edge of the top, so that the saw may be made to traverse the width of the table adjacent this edge, while a support beneath the table holds objects to be sawed, such as boards or the like, up against the under side of the table top and a backing piece beneath the top which acts as a stop; said backing piece being hinged at one end and removably clamped at the other end so that the object being sawed may be held at various angles relative to the guide.

Other objects will appear hereinafter.

I attain the foregoing objects by means of the devices, parts, and combinations of parts shown in the accompanying drawings in which—

Figure 1 is a perspective view of my guide plate in expanded relation to a power driven hand saw, showing the means of attachment; also the relation of the guide plate to a guide rail;

Figure 2 is a perspective view of a saw provided with the guide plate, here concerned, and applied to a guide rail attached to a door and drawn on a somewhat reduced scale;

Figure 3 is an end view of the saw frame, guide plate in place on the saw frame, and inserted in working position on a rail attached to said door.

Figure 4 is a perspective view of the saw and guide members with the rail attached to a table beneath the top of which lumber is held to be sawed;

Figure 5 is a plan view of said saw and table; and

Figure 6 is a sectional elevational view thereof taken substantially on line 6—6 of Figure 4.

Similar numerals refer to similar parts in the several views.

Referring to the drawings, 2 indicates the saw frame whereon the circular saw blade 3 is mounted and driven by electric motor 4. This frame has a handle 5 by which the user directs the saw and a shoe 6 to support the weight of the saw frame as it is moved over the surfaces of objects being sawed. A saw guard 7 is pivotally attached to the under side of shoe 6 to enclose the lower, or cutting, segment of the saw blade, and a stationary guard 8 is rigidly attached to frame 2 and encloses the upper portion of the saw.

On the bottom of the frame 2 there is a base plate 10 to which shoe 6 is hinged on pins 12. This enables the user to tilt the entire saw body relative to the shoe in order to make angle cuts. A slotted brace 14 held by a thumb nut and bolt 15 will hold the body 2 at any angle desired with reference to shoe 6 to vary the depth of cut of saw 3.

To the front and rear edges 16 and 17, respectively, of shoe 6, and near its inner edge 18, there are two upwardly extending lugs 20 and 21. These have holes 19 to receive bolts 22 which have thumb nuts 23. A guide plate 24 has flanges 25 at its fore and rear edges which extend beyond its inner edge 26 a distance sufficient to overlap the outside faces of lugs 20 and 21. These outwardly extending flanges are provided with holes 29 which mate holes 19 on lugs 20 and 21. Rabbet grooves 30 form shoulders against which the lower edges 31 of flanges 26 rest providing firm attaching joints between these parts when bolts 22 and nuts 23 are tightened.

Along the outer edge of guide plate 24 there is an upturned guide flange 32 which slidably engages the downwardly opening groove 33 of guide rail 34.

Guide rail 34 has a substantially vertical outer plate 35 along the upper edge of which groove 33 is formed by top strip 36, and an outer strip 37. Plate 35 is joined along its bottom edge to substantially horizontal base plate 38. This base plate has holes 39 to receive securing screws or other suitable attaching means, such as clamps 40.

The guide rail 34 may be made in one continuous piece, as shown in Figures 4 and 5, or in jointed sections 34a, 34b, and 34c, which are joined by bolts 42, as shown in Figure 2.

The guide rail 34 may be clamped to a door 44, as shown in Figure 2, so that the saw guide plate 24, shoe 6, and frame 2 will be guided along edge 45. By this means a strip may be cut from the door which will accurately follow a predetermined line, at any desired angle, as controlled by the guide rail. A length of lumber may, obviously, be substituted for the door 44 and ripping cuts taken along its edges. For cross-cuts the rail 34 is attached to the top 46 of table 47, Figures 4 to 6, near its right hand edge. The saw frame 2 may then be run along the rail with the blade extending below the top surface of table top 46. Lumber 48 may be inserted under table top 46, and supported on under rails 50, and held against a backing piece 51 which forms a stop.

Under-rails 50 are supported by bolts 52 extending thru slots 53 in legs 54 of the table, and holes in the rails. Stop 51 is supported by a hinge 56 at its end beneath guide rail 34, and is provided with a bolt and thumb nut 55 on its opposite free end. The bolt 55 extends upward thru table top 46 and will move in an arcuate slot 57 which is formed on a radius extending from the axis of pivot of hinge 56. Cut-out holes 59 enable the user to hold lumber piece 48 against stop 51 by insertion of the users' thumb thru the hole nearest the edge of the lumber which is opposite the edge contacting the stop. The saw is moved thru the lumber, which remains stationary.

Figure 4 shows the saw and the table arranged for a straight or right angle cross cut. Figure 5 shows the saw and table adjusted for an angle or miter cut. In all operations it is to be noted that the saw slides on top of or above the object being cut. The lower segment of the blade does the cutting and is at all times directed downward. The lower guard, covering this segment, is not disturbed, but covers the saw the same as when the saw is used without the attachments shown. This construction makes use of all the safety features incorporated in the saw frame.

It is to be noted that the guide flange 32 extends upward into the downwardly opening groove 33. This construction makes it unnecessary for the user to hold the frame 2, shoe 6, or guide plate 24 down on the guide rail during a cutting operation. The saw is securely held in the prearranged position relative to the rail and cannot jump out of position even if the saw should become cramped in the work or encounter an unsawable obstacle. The preferred practice is to insert the guide flange 32 into the groove 33 at the end of rail 34, as shown in Figure 2. As the shoe 6 moves over the top face of the work (such as door 44) or the top face of table top 46, the guide flange 32, while it extends up into groove 33, does not contact the bottom of the groove. A slight clearance is provided between these parts. If desired, the fit of the flange 32 within groove 33 may be made with enough clearance so that the guide plate 24 may be removed by lifting the outer part of the saw frame 2 and swinging it slightly toward the guide rail outer strip 37. Flange 32 may be thus swung or rotated outward from the guide rail groove. This means of removal requires positive direct effort, however, and since a cutting operation requires that the shoe be made to slide on the face of the work, the flange could never be removed from the groove during cutting operation because the shoe is always pressed down on the face of the work.

In use, in addition to the foregoing explanation, it is to be understood that guide plate 24 is attached to the saw whenever it is set up for use, and may be removed by removal of bolts 22 when it is desired to pack the saw away in a small space. The provision of this detachable plate does not limit the uses of the saw for other purposes than those here described. With the plate in place, and by use of the guide rail, accurately guided cuts may be made either ripping the lumber lengthwise, or cross-cutting lumber at any desired angle.

I claim:

1. Guide mechanism for power driven hand held circular saw, having bodies with shoes on the bottom thereof, laterally disposed saw blades, composed of a guide plate detachably secured to the saw body shoe along its side opposite said saw blade, having an upwardly turned guide flange along its outer edge; a guide rail composed of a horizontally extending base plate, a vertically extending guide plate attached thereto, having a downwardly opening guide groove along its upper edge disposed to receive said guide flange so that it will slide longitudinally therealong; a sawing table having a flat top; attaching means securing said guide rail to said table top adjacent to a lateral edge thereof; under rails on said table supporting objects to be sawed beneath said table top; and a stop attached to the underside of said table top, hinged at one end and supported to be moved in an arcuate path at the other end, for positioning objects to be sawed at various desired angles relative to the direction of cut of said saw as determined by said guide rail.

2. In guide mechanism for a power driven hand held circular saw having a body with a shoe on the bottom thereof, a laterally disposed saw blade, and guide mechanism composed of a guide plate detachably secured to the saw body shoe along its side opposite said blade having an upwardly turned guide flange along its outer edge, a guide rail composed of a horizontally extending base plate, a vertically extending guide plate attached thereto, and a downwardly opening guide groove along its upper edge disposed to receive said guide flange so that it will slide longitudinally therealong, the combination therewith of a sawing table having a rectangular flat top and supporting legs at each corner, attaching means securing said guide rail to said table top adjacent a lateral edge thereof, so that said saw blade will have a cutting path parallel to and over-hanging said edge; under-rails attached to said table legs and vertically adjustable thereon for supporting objects to be sawed beneath said table top; and a stop attached to the under-side of said table top hinged at one end adjacent the edge along which said saw travels and supported to be moved in an arcuate path at the other end, for positioning objects to be sawed at desired angles relative to the cutting path of said saw.

3. In guide mechanism for a power driven hand held circular saw having a body with a shoe on the bottom thereof, a laterally disposed saw blade, and guide mechanism composed of a guide plate detachably secured to the saw body shoe along its side opposite said blade having an upwardly turned guide flange along its outer edge, a guide rail composed of a horizontally extending base plate, a vertically extending guide plate attached thereto, and a downwardly opening guide groove along its upper edge disposed to receive said guide flange so that it will slide longitudinally therealong; structure supporting said saw and guide rail composed of a sawing table having a rectangular flat top and supporting legs at each corner, attaching means securing said drive rail to said table top adjacent a lateral edge thereof so that said saw blade will travel in a cutting path parallel to said edge; under-rails removably attached to said table legs and vertically adjustable thereon for supporting objects to be sawed beneath said table top; and a stop swingably attached to the under side of said table top at one end and removably attached at the other end to permit said other end to travel in an arcuate path, for positioning objects to be sawed at various angles relative to the said path of said saw; said table top having cutout holes adjacent said backing piece so that said objects to be sawed may be grasped and held against said backing piece while resting on said under-rails.

References Cited in the file of this patent

UNITED STATES PATENTS

| Number | Name | Date |
|---|---|---|
| 1,587,734 | Jacobs et al. | June 8, 1926 |
| 1,713,727 | Waller | May 21, 1929 |
| 1,788,256 | Sherwin | Jan. 6, 1931 |
| 1,911,045 | Tinnen | May 23, 1933 |
| 1,960,590 | McKay | May 29, 1934 |
| 2,599,893 | Butler | June 10, 1952 |
| 2,634,767 | Chappell | Apr. 14, 1953 |